United States Patent [19]
Shalev

[11] Patent Number: 5,764,522
[45] Date of Patent: Jun. 9, 1998

[54] PROGRAMMABLE SYSTEM FOR CONTROLLING, REGULATING, AND ADJUSTING FLOW OF ANIMAL-FEED MATERIAL FROM A MATERIAL STORAGE VESSEL

[76] Inventor: Matti Shalev, 218 St. Andrews Rd., Statesville, N.C. 28677

[21] Appl. No.: 396,011

[22] Filed: Feb. 28, 1995

[51] Int. Cl.[6] .............................. G06F 17/00; B67D 5/08
[52] U.S. Cl. ...................... 364/479.1; 364/567; 222/58
[58] Field of Search .................................. 364/478, 479, 364/140–146, 567, 478.01–479.14; 222/58, 77, 55–57, 1, 63, 64; 141/83; 366/141

[56] References Cited

U.S. PATENT DOCUMENTS

| Re. 32,101 | 4/1986 | Ricciardi et al. | 222/56 |
|---|---|---|---|
| Re. 34,776 | 11/1994 | Pratt | 366/141 |
| 5,487,603 | 1/1996 | Hoff et al. | 366/141 |

Primary Examiner—Reba I. Elmore
Assistant Examiner—Steven R. Garland
Attorney, Agent, or Firm—Kilpatrick Stockton LLP; Charles W. Calkins

[57] ABSTRACT

A system that monitors and controls the flow of animal feed from an animal-feed storage vessel including a device for generating a weight signal corresponding to the weight of the vessel, a device for controlling the vessel's dispensing mechanism, a device for generating input signals corresponding to entered commands and numbers, a device for processing weight and input signals and generating controls signals and data therefrom, a device for storing signals and data, a device for displaying data and for prompting the entry of commands, a device for communicating signals within the system, and a device for receiving feed from the vessel for distribution to animals.

30 Claims, 12 Drawing Sheets

KEY TO FIGURES 4B, 4C, 4D AND 4E

| COMPONENT | LETTER IDENTIFIER |
|---|---|
| CAPACITOR | C |
| EPROM (ERASABLE PROGRAMMABLE READ ONLY MEMORY INTEGRATED CIRCUIT) | U |
| JUMPER | J |
| RESISTOR | R |
| VARISTOR | V |
| TERMINAL | T |
| TRANSMITTER OF DATA VIA COMMUNICATION PORT | TDX |
| RECEIVER OF DATA VIA COMMUNICATION PORT | RDX |
| TRANSMISSION CIRCUIT | X |

FIG. 4A

PROGRAMMABLE SYSTEM FOR CONTROLLING, REGULATING, AND ADJUSTING FLOW OF ANIMAL-FEED MATERIAL FROM A MATERIAL STORAGE VESSEL

FIELD OF THE INVENTION

The present invention relates to a system for monitoring and controlling the flow of material from a material storage vessel. The system may be advantageously utilized to monitor and control the flow of feed from a feed storage vessel on a livestock farm. The system includes a process and a preferred apparatus for conducting the process.

BACKGROUND

Feed storage bins have been used in the livestock industry for many years. Feed storage bins generally provide an inventory of food dispensable over a sustained period of time in regular quantities to a feed trough. Control of the dispensed quantities of feed and dispensing times, allow the livestock herd being fed from the storage bin to be maintained in good health and physical condition through a growing season so as to ultimately bring the livestock to a marketable condition at minimum cost.

Feed storage bins are generally provided with regulating devices to dispense feed in an even and consistent manner. However, it has been only rather recently that more sophisticated devices have been employed to monitor herd daily feeding practices, accumulate the quantity of feed fed to a flock over a period of time, govern the precise time of day for feedings to take place, and monitor total inventory of feed so that orders can be placed for additional supplies of feed in a cost efficient manner.

A need has now developed for monitoring, regulating, dispensing and predicting the consumption of feed for livestock through various computerized devices or data processing components. The most practical of these appear to be devices used to sense the weight of the feed carried by the bin at any particular time so that various pieces of information can be processed from that monitoring activity.

Data processing equipment and computer controlled devices for accumulating feed information and regulating feed flow have now been developed and are finding their way into various farms where poultry flocks and livestock animals are being raised over discrete periods of time. Theses devices can take many forms. For example, a computer controlled device may monitor within the bin when first filled and thereafter in increments to determine feed flow and inventory needs. One of the most effective developments in this area involves data processing equipment that is weight sensitive and has means for monitoring and controlling feed flow over a wide range of conditions.

The data processing devices that are currently employed in the livestock industry are generally based on one of the following basic concepts:

i) Measurement of feed flow by way of quantifying the dispensing process based on time or volume of electricity consumed by the feed dispenser's (auger) motor.

ii) Measurement of feed flow by using an intermediate hopper of a known volume and controlling the number of refills and dumping cycles.

iii) Measurement of feed flow by way of transferring the feed from one bin to another in predetermined quantities as to dispense the known quantity to the livestock.

iv) Measurement of feed flow and inventory by way of volume measuring device (such as ultra sonic waves) and converting the volume contained in the bin to weight.

v) Measurement of feed flow and inventory by way of weighing the entire vessel using electronic load cells and indicators to display and process the data.

The present invention is described below with reference to the fifth above mentioned concept and provides advantageous means for implementing the technique and using and processing data received from the electronic load cells.

Existing similar systems provide means for monitoring and controlling the following events:

i) Dispensing of known feed quantity.

ii) Display of the feed quantity in the bin.

iii) Set points of feed inventory as an indication when it falls below a fixed level. However, the above events are all taken from industrial applications and are not sufficiently addressing specifically unique needs that exist in the livestock industry.

The need for reducing the costs involved in raising livestock has increased and the present invention is directed to solving that long felt need through the generating and processing of data.

SUMMARY OF THE INVENTION

Accordingly, an object of the present invention to provide a novel and improved system for generating and using data from the on-line weighing of feed storage bins, which has all of the advantages of the prior art and none of the disadvantages.

The present invention advantageously provides a new and improved system for storing and processing data in order to reduce the costs of livestock feed manufacturing and delivery, and the costs of maintaining a feed inventory. However, as will be realized from the following description, the methods and apparatus are also advantageous for use in the management and control of material inventory for materials other than livestock feed.

The system of the present invention includes one, or more, of the following features for a monitoring and controlling material flow and material inventory in a storage vessel having a port for adding material to the vessel; dispensing means for dispensing material from the vessel; sensors for detecting the weight of the vessel and/or the weight and/or amount of material in the vessel; and a data processing instrument, comprising data processing means and memory means in communication with the sensors:

i) A method and apparatus for monitoring and controlling material flow and material inventory in more than one storage vessel with the same data processing instrument;

ii) An ability to detect and/or register the date, time and/or quantity of material added to the storage vessel or vessels;

iii) An ability to control and monitor the amount of material dispensed from the vessel, including an ability to control the quantity of material dispensed, and/or the time period of the dispensing operation;

iv) An ability to calculate and display a total cumulative quantity or material dispensed out of the vessel over a selected time period;

v) An alarm and the ability to program events that will trigger the alarm, for example material level set points in the storage vessel that when reached will trigger the alarm;

vi) An ability to program the data processing instrument to activate/deactivate the dispensing mechanism based on a normally opened or a normally closed circuit;

vii) An ability to program the data processing instrument to automatically stop a dispensing process when new material is being added to the storage vessel and/or when the amount of material inside the vessel falls below a certain level;

viii) An ability to deactivate the dispensing mechanism when a port (if any) for adding material to the vessel is opened;

ix) An ability to retain a zero or calibration reference value in the data processing instrument and the ability to re-enter these values and electronically perform a zero/calibration procedure;

x) A security system for screening access to particular functions of the data processing instrument and/or overall system, through a screening procedure, preferably a two stage screening procedure, for example:

| A-Are you sure? | B-Password?; |
| --- | --- | xi) An ability to establish an interface between the data processing instrument and a larger computer system and transmit data to the larger computer system via a communication mode;

xii) An ability to establish a user defined minimum weight which constitutes a delivery.

As will be recognized from the foregoing features, when utilized in with a feed storage vessel, the present invention advantageously provides a new and improved system for accurately calculating the amount of feed added to a bin during delivery of feed to the bin.

The present invention also advantageously provides a system which allows the calculation of the cumulative feed quantity dispensed from a feed storage bin over a predetermined time interval, for example since the animals were placed on the farm.

The present invention further advantageously provides a new and improved system which allows for the triggering of an alarm when level of feed in the feed storage bin is reduced below predetermined, programmable set points, thus enabling the user to retain a lower inventory of feed and more efficiently plan feed manufacturing and delivering systems. For example, the entire operation of producing feed from raw materials forward may be more efficiently planned.

The present invention still further advantageously provides a new and improved system for dispensing feed from a feed storage bin to livestock based on time data and/or quantity data.

The present invention still further advantageously provides a new and improved system for monitoring and controlling more than one feed storage bin with the same controlling device.

Another feature of the present invention is that the system of the present invention allows a user to customize the system to be programmed to activate and deactivate feed dispensing mechanism based on a "normally open" or a "normally closed" configuration of the feed storage bin dispensing means and/or the feed storage bin dispensing means relay.

An additional feature of the present invention is that the system of the present invention provides a new and improved method for retaining a "zero" value and/or calibration reference values thereby enabling a user to re-enter those values and "zero" or calibrate the system, without the need to empty the feed storage bin or fill the feed storage bin with a known quantity of feed.

Yet another feature of the present invention is that the system of the present invention provides a new and improved method for secure predetermined menu items through the use of screening steps: for example, A—Are you sure? B—Password?

These features and advantageous are explained in more detail, and other features are discussed, in the following description.

The features and advantages of the present invention have been outlined, rather broadly, in order that the following detailed description may be better understood and in order that the contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of the design, hardware, software and to the arrangement of the components set forth in the following description or illustrated in the flow chart drawing. The invention is capable of the embodiments and of being practiced and carried out in various ways.

It is also to be understood that the phraseology and terminology employed herein are for the purpose of description and should not be regarded as limiting. Those skilled in the art will appreciate the concept upon which the disclosure is based and may readily be utilized as a basis for designing other structures, software and systems carrying out the several purposes of the present invention. It is important that the claims be regarded as including such equivalent concepts in so far as they do not depart from the spirit and scope of the present invention.

BRIEF DESCRIPTION OF THE DRAWINGS

FIGS. 4a, 4b, 4c, 4d and 4e are representations of one embodiment of a circuit design for the data processing and display means of the system of the present invention.

DETAILED DESCRIPTION OF THE INVENTION

Figure 1:
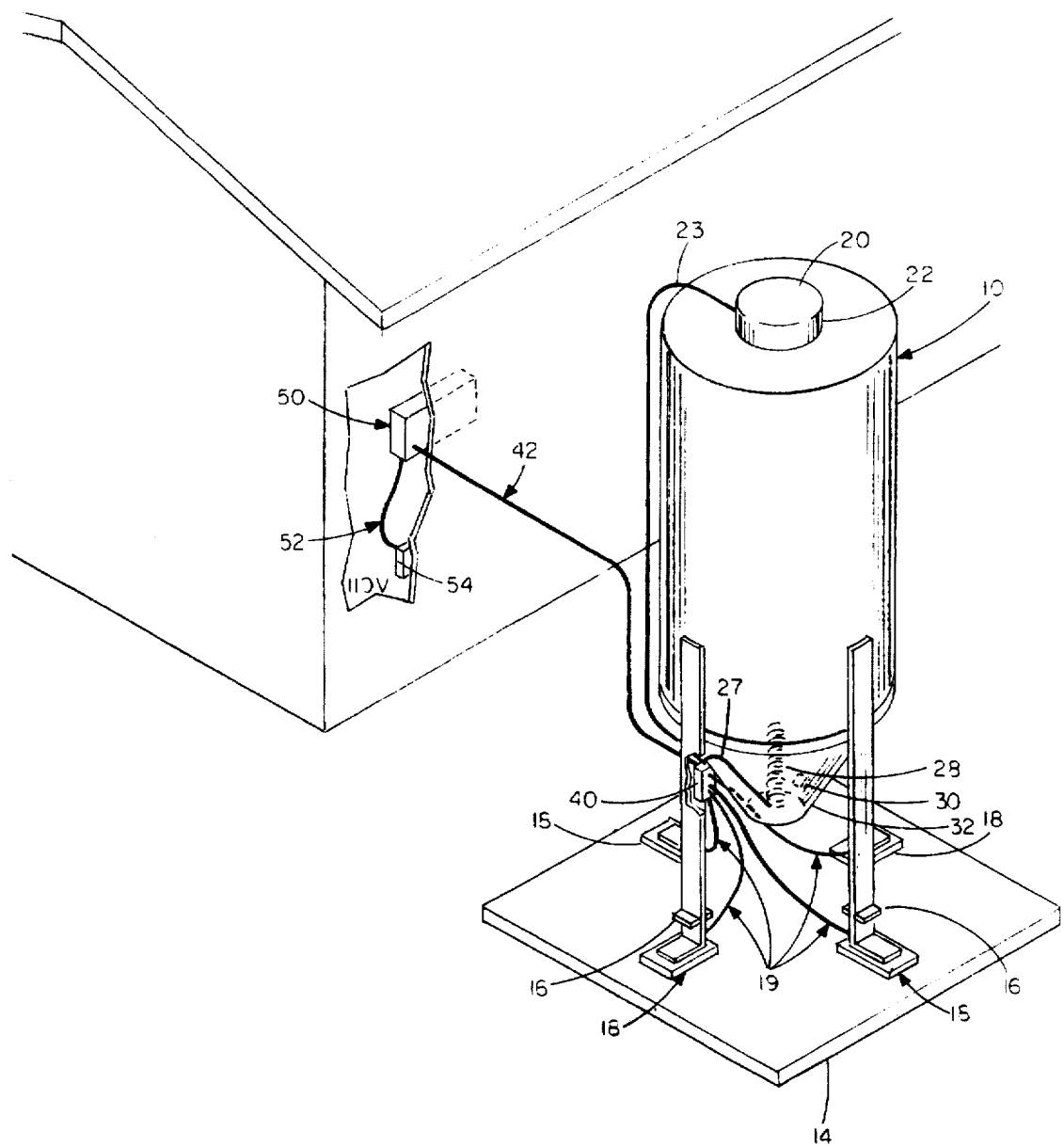
FIG. 1 illustrates an embodiment of the system of the present invention utilizing a feed storage bin.

The present invention provides a system for monitoring and controlling material flow from a material storage vessel, the vessel having a delivery port to allow the addition of material to the vessel and dispensing means for dispensing material from the bin, the system comprising:

means for generating a weight signal corresponding to the weight of the storage vessel;

means for controlling whether the dispensing means is operating;

input means for entering commands and numbers and for generating input signals corresponding to said commands and numbers;

processing means, including clock means, for processing said input signals, for generating control signals in response to said weight signal and input signals to control said dispensing means operation and for generating data based on calculations performed utilizing said weight signal, said input signals, said clock means and said dispensing means operation;

memory means for storing said weight signals, input signals and said generated data; and display means for displaying data generated by said processing means and for displaying a prompting screen for prompting the entry of data utilizing said input means;

communication means for communicating said weight signal and said signals generated from said input means to said processing means, and for communicating said control signals and display signals generated by said processing means to said controller and said display means.

Preferably, the system of the present invention further comprises one or more of the following features:

means for generating an open/close signal corresponding to the state of a delivery port of the storage vessel, wherein an open signal is generated when the delivery port is open and a closed signal is generated when the delivery port is closed;

prompting means, preferably in the form of at least one menu, for prompting user inputs through said input means;

means for programming the processing means to halt the dispensing means while material is being added to the vessel;

means for programming the processing means to generate an alarm corresponding to user definable weights of the storage vessel; and/or second communication means for communicating said data generated by said processing means to additional processing means.

In addition, it is preferred that the processing means of the present invention include one of the following features:

security means for preventing input signals from unauthorized users to generate control signals, and for screening access to said generated data retained in said memory means; and/or means for programming the processing means to generate a control signal to halt the operation of the dispensing means when the weight of vessel reaches a user definable level.

The system of the present invention may be advantageously utilized in a method of the present invention. According to the present invention a method, utilizing a computer processing apparatus, for monitoring the amount of material in a storage vessel and for controlling the dispensing of material from the vessel, said vessel having dispensing means for dispensing material from the vessel, comprises:

generating a weight signal corresponding to the weight of the storage vessel;

inputting commands and numbers utilizing input means of said computer processing apparatus and generating input signals corresponding to said commands and numbers;

communicating said weight signal, and said signals generated from said input means to said processing means;

processing said input signals and said weight signals to generate control signals and display signals in response to said weight and said input signals, and to generate data based on calculations performed utilizing said weight and said input signals;

storing said weight, said input signals and said generated data;

communicating display signals generated by said processing means to said controllers to display means of said computer processing apparatus and displaying data generated by said processing means on said display means; and communicating said control signals generated by said processing means to control means in communication with said dispensing means; thereby controlling the operation of said dispensing means to control the dispensing of material from said vessel.

Preferably, the method of the present invention further comprises one or more of the following steps:

displaying a prompting screen on said display means for prompting the inputting of the commands and numbers on said input means;

generating a open/close signal corresponding to the state of a delivery port of the feed storage bin, wherein an open signal is generated when the delivery port is open and a closed signal is generated when the delivery port is closed, and communicating the open/close signal to the processing means which halt operation of said dispensing means when an open signal is received by said processing means;

programming the processing means to generate an alarm corresponding to user definable weights of the storage vessel;

communicating said data generated by said processing means to additional processing means;

preventing input signals from unauthorized users to generate control signals;

screening access to said generated data retained in said memory means; and/or programming the processing means to generate a control signal to halt the operation of the dispensing means when the weight of vessel reaches a user definable level.

As outlined below, in the description of an embodiment of the system of the present invention, the system may be assembled from conventional equipment and computer component pieces, and the method of the present invention may be performed utilizing conventional weighing, communication and computer processing equipment. Suitable conventional equipment and computer processing apparatus include those described below with reference to an embodiment of the system of the present invention.

An embodiment of the system of the present invention for use with livestock feed storage bins, is described with reference to FIGS. 1 and 2.

Referring to FIG. 1, livestock feed storage bins, such as the one shown as feed bin, 10, generally are utilized worldwide to feed flocks and herds of livestock that are nourished and maintained on farms for various food and breeding markets. These bins are normally installed on a concrete pad, 14, and are secured to that pad by feet, 16, that engage bolts usually embedded in the pad when it is poured. Connecting the bin to the pad with these bolts insures that it will not be dislodged or toppled in the event of windstorms or other adverse conditions or occurrences. Load sensors, 18, are provided between the concrete pad and each of the feet, to measure the weight of bin 10. Suitable load sensors for use in the present invention are commercially available and include conventional strain sensors. The load sensors may be added to existing storage vessels utilizing the apparatus and techniques described in my U.S. Pat. No. 5,490,479 the disclosure of which is hereby incorporated by reference. Input signals generated by each load sensor are communicated by electrical communication means 19, to a junction box 30 located on one of the legs of bin 10, and ultimately to processor and display means 50. Suitable electrical communication means include shielded cables and the like.

Bin 10, also includes port 20 which may be opened to add feed to the bin. Switch 22 may be provided to generate an open/close signal corresponding to whether port 20 is open or closed. Suitable switches for use in this application include plunger type switches (e.g. the type utilized in a door jam) and contact type switches. Electrical communication means, 23, are provide to transmit the open/close signal from switch 22 to junction box 40 and ultimately to data processing and display means 50. Suitable electrical communication means include shielded cables and the like.

Bin 10, may further include port 24 which may be opened to dispense feed. Switch 26 may be provided to generate an open/close signal corresponding to whether port 24 is open or closed. Suitable switches for use in this application include plunger type switches (e.g. the type utilized in a door jam) and contact type switches. Electrical communication means, 27, are provided to transmit the open/close signal from switch 26 to junction box 40 and ultimately to data processing and display means 50. Suitable electrical communication means include shielded cables and the like.

Bin 10 additionally includes dispensing means 28, for dispensing feed from the bin. Suitable dispensing means include augers and the like, known in the art for dispensing materials from bins. Sensing and dispenser control means 30 are provided to generate an input signal corresponding to whether dispensing means 28 are operating and dispensing feed from bin 10, or not operating, and to control the starting and stopping of the dispensing means. In the situation where a relay is utilized to control the operation of the dispensing means, the sensing means may simply comprise an electrical signal from the open or closed circuit, depending on the configuration of the relay utilized to control operation of the dispensing means.

Electrical communication means 32 are provided to transmit the signals from sensing and dispenser control means 30 to junction box 40 and ultimately to processing and display means 50. Suitable electrical communication means include shielded cables and the like.

Certain storage vessels may not be equipped with a dispensing port 24. Instead, the operation of the dispensing means will determine whether feed is being dispensed from the bin. In the system of the present invention it is possible to use the operating/non-operating signal from the dispensing means as a means for determining whether feed is being dispensed from the vessel.

The types of dispensing means conventionally utilized in the industry include an auger, or similar feed dispensing mechanism, which is motor driven. The operation of the motor is controlled by through the use of a relay between the motor's power source and the motor. In operations where the dispensing means (auger) is in continuous operation, and is stopped to halt the dispensing of feed, it is generally preferable to utilize a closed relay during operation which upon opening will stop the auger. In contrast, in operations where the dispensing means (auger) is normally not operating, and is operated to dispense feed, it is generally preferable to use an open relay which upon closing will start the auger.

The operation of these relays may be utilized in the system of the present invention to control the operation of the dispensing means. In the system of the present invention the processing means may be programmed for a normally opened relay which is closed to operate the dispensing means, or for a normally closed relay which upon opening will stop the auger, depending on which type of relay is utilized in the dispensing means. The dispensing means operation may then be controlled by the processing means by closing or opening the relay, as necessary, in response to the input signals.

As will be recognized by those of ordinary skill in the art, it is possible to construct a feed storage bin such that feed is dispensed by gravity through the bottom of the bin. In such construction, dispensing means 28, and the associated sensing and control means and electrical communication means for the dispensing means, would be omitted. Switch 26 could be retained to indicate whether a dispensing port is open or closed, wherein an open port could be indicative of feed being dispensed. In this type of embodiment, the system of the present invention could be utilized to monitor and control the opening and closing of dispensing port 24, and thereby monitor and control the dispensing of feed.

Junction box 40 is utilized to provide a junction for electrical communication means 19,23 and 27. Electrical communication means 42 are utilized to establish electrical communication between junction box 40 and data processing and display means 50 and transmit the input signals from the load sensors, sensing means, dispensing means and switches to said processing means. Electrical communication means 42 are also utilized to transmit output signals from data processing and display means 50, through junction box 40 and electrical communication means 19,23 and 27 to the switches and dispenser control means.

As further shown in FIG. 1, processing and display means 50, may be electrically connected, through connection means 52, to a source of A/C power, 54.

Data processing and display means 50 are shown in more detail in FIG. 2 and FIGS. 4a, 4b, 4c, 4d and 4e. Processing and display means 50, may include alphanumeric and/or function keys, 62, capable of being depressed to generate input signals. Also included are display means 64, for providing a visual display of data processed by the processing means, and for providing menu prompts to a user of the system.

Figure 2:
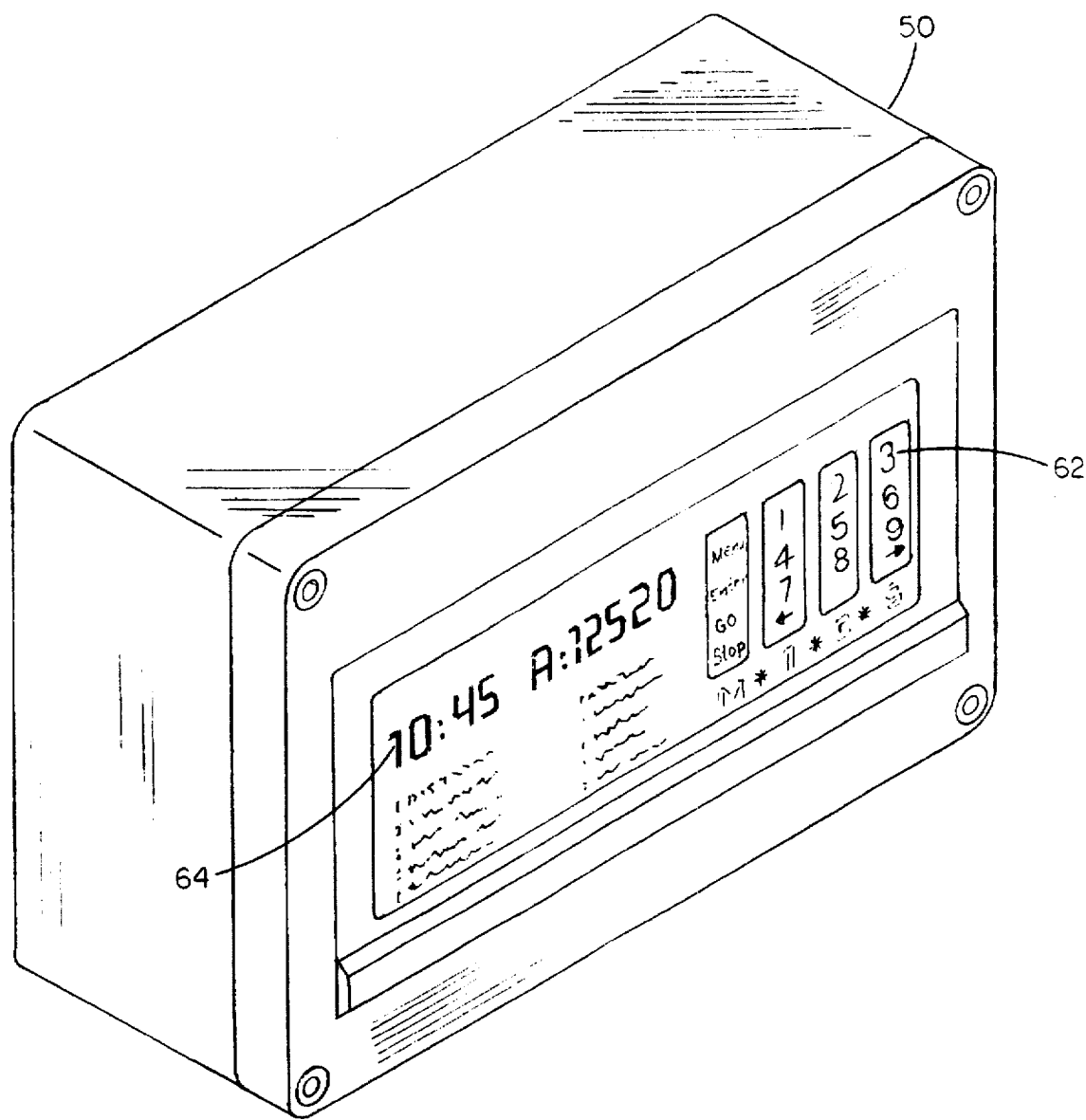
FIG. 2 illustrates an embodiment of data processing and display means suitable for use in the system of the present invention.

Although not depicted in FIG. 2, data processing and display means 50 may include microprocessor means and memory means for receiving, storing and processing input signals received from the load sensors, sensing means and switches utilized in the system. The data processing and display means 50 may incorporate any conventional microprocessor, such as the 808X6 series and pentium series manufactured by Intel Corporation, or the 680X0 and PowerPC series manufactured by Motorola Corporation. Similarly, conventional memory means may be utilized, such as commercially available RAM and ROM chips.

As will be obvious to those of ordinary skill in the art, the data processing and display means 50, depicted in FIG. 2, is only one of the many possible embodiments of data processing and display means suitable for use in the system of the present invention. It is possible to utilize conventional computer means comprising a video display terminal, keyboard, and central processing unit as the data processing and display means in the system of the present invention. Similarly, a laptop computer, may be utilized as the data processing and display means. It is also possible for the input and display means to be separated from the processing means, and located in different places. Preferably if the data processing and display means is a self contained unit, it will further comprise means for interfacing with other computer means, for transmitting data and the like to other computers for use in programs run on the other computers.

One possible circuit design and configuration for data processing and display means 50 is shown in FIGS. 4a, 4b, 4c, 4d and 4e which depict a circuit board configuration for use in the data processing and display means 50. It is believed that the information provided in FIGS. 4a, 4b, 4c, 4d and 4e is readily understandable to those skilled in the art of circuit board design and therefore not described herein in more detail.

The use and operation of an embodiment of the system of the present invention is described with reference to FIGS.

3a, 3b, 3c, 3d and 3e which present the operation of the system in flowchart form.

Referring to FIG. 3, as shown in step 100, load sensors generate an input signal corresponding to the weight of the feed bin or feed bins. As will be recognized by those of ordinary skill in the art, there are numerous farms that utilize more than one feed bin. It is generally cost effective and more efficient to utilize a single system for monitoring and controlling feed flow from the plurality of feed bins. The system of the present invention may be utilized to monitor and control feed flow from a plurality of feed bins. In this embodiment, the electrical communication means from the load sensors are connected to a junction box, and from the junction box all bins are connected in parallel to the data processing and display means.

Figure 3A:
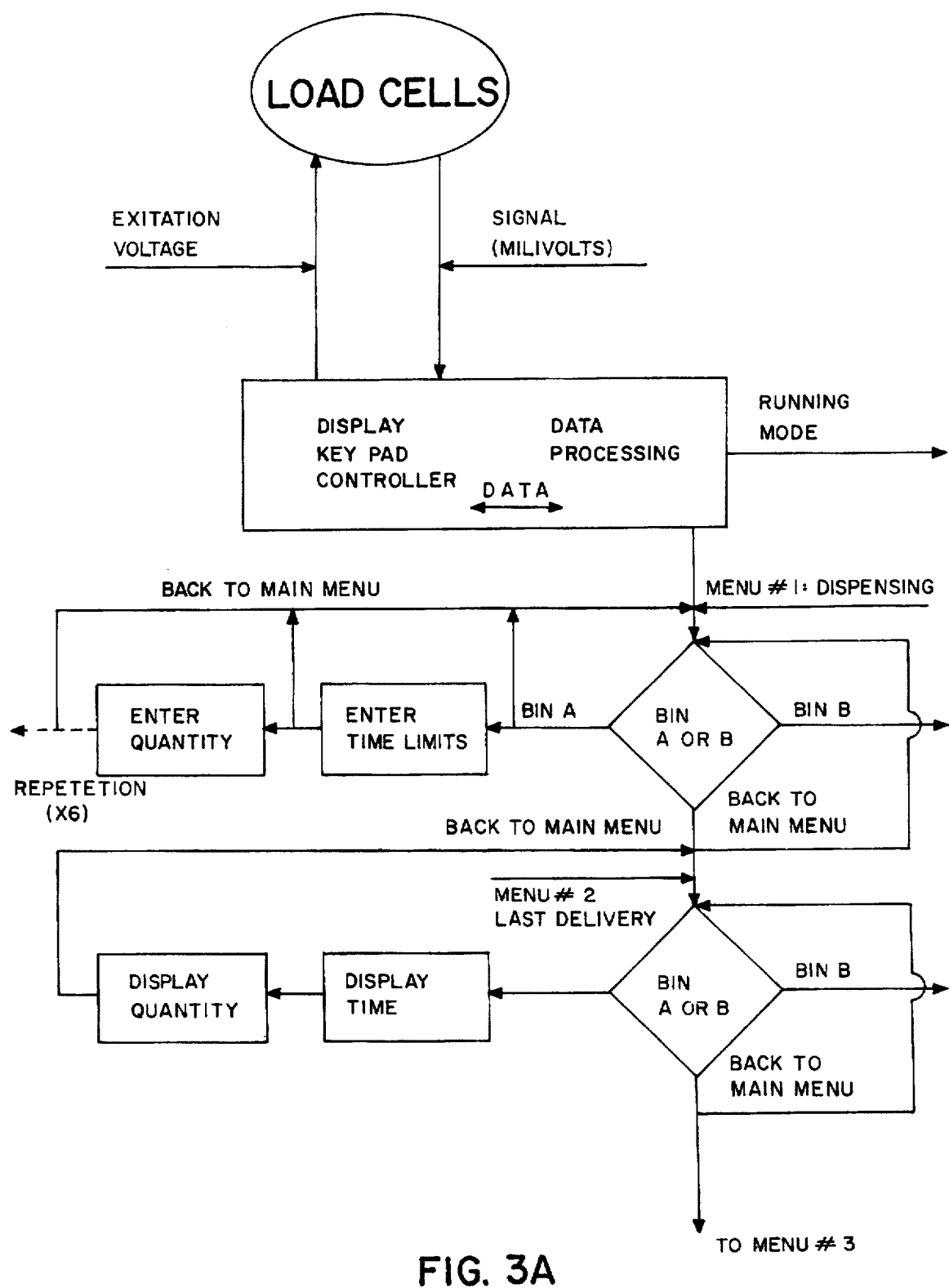
FIGS. 3a, 3b, 3c, 3d and 3e are flow charts illustrating an embodiment of the menu system of the present invention.
Figure 3B:
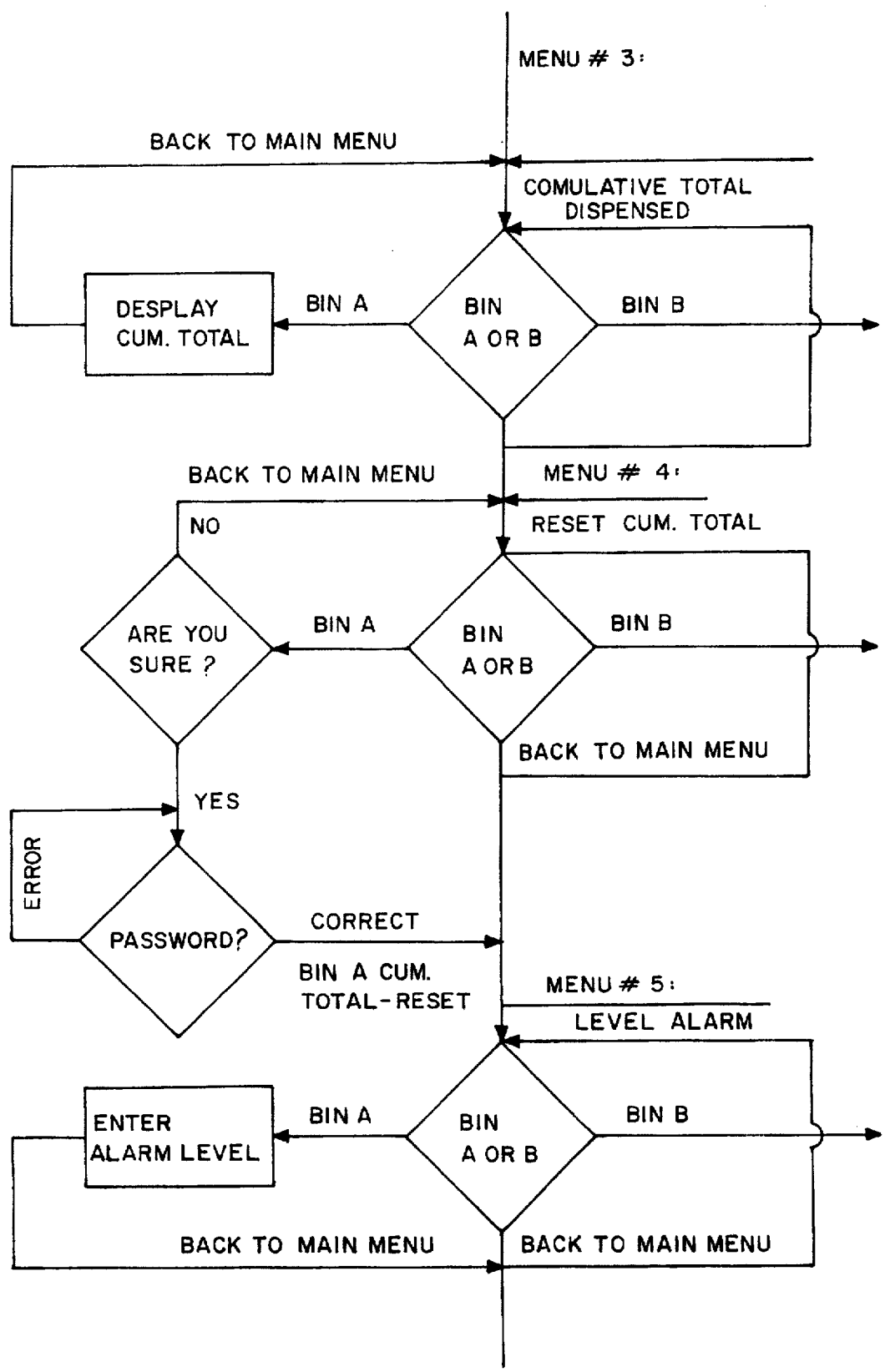
Figure 3C:
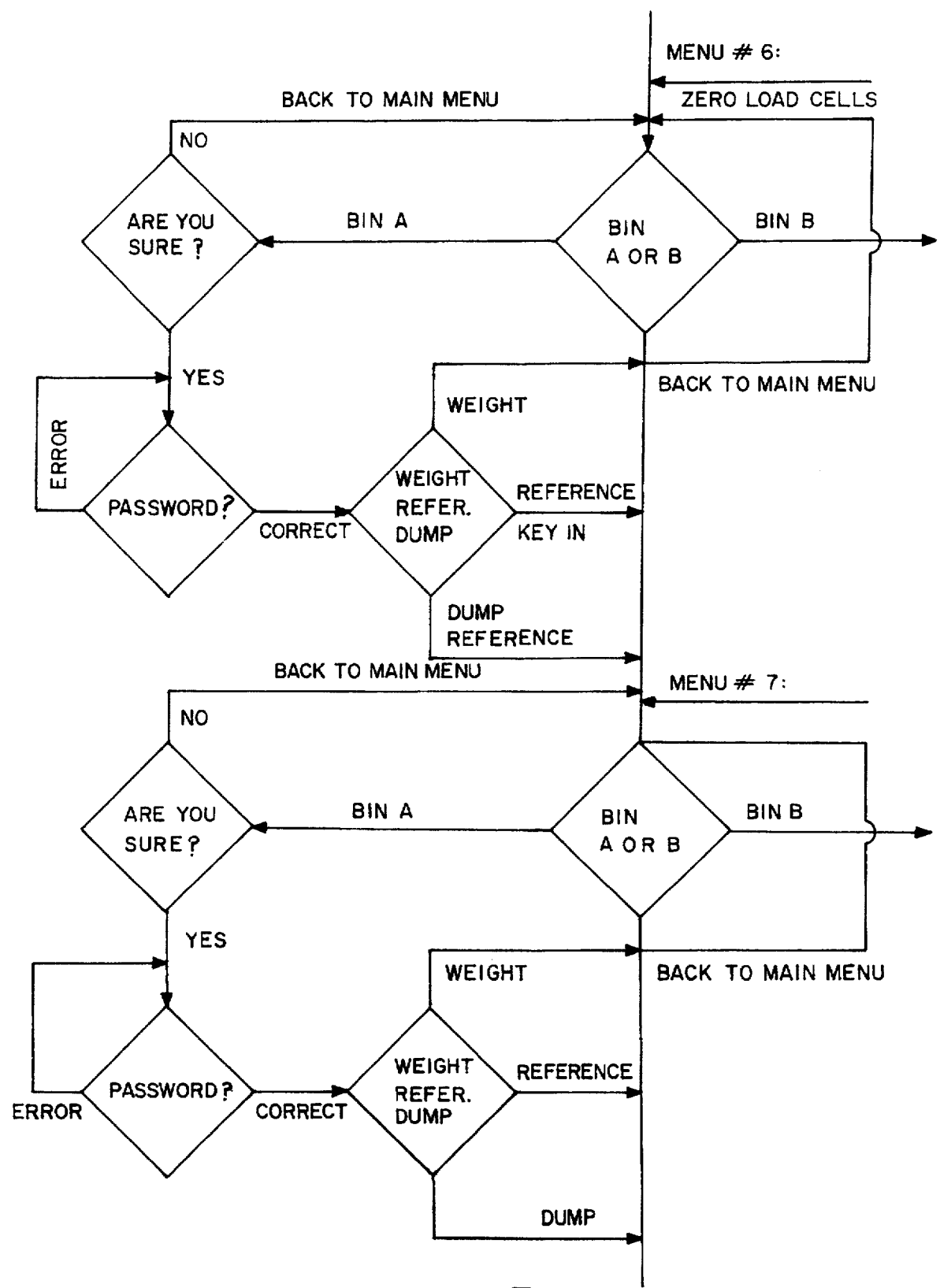
Figure 3D:
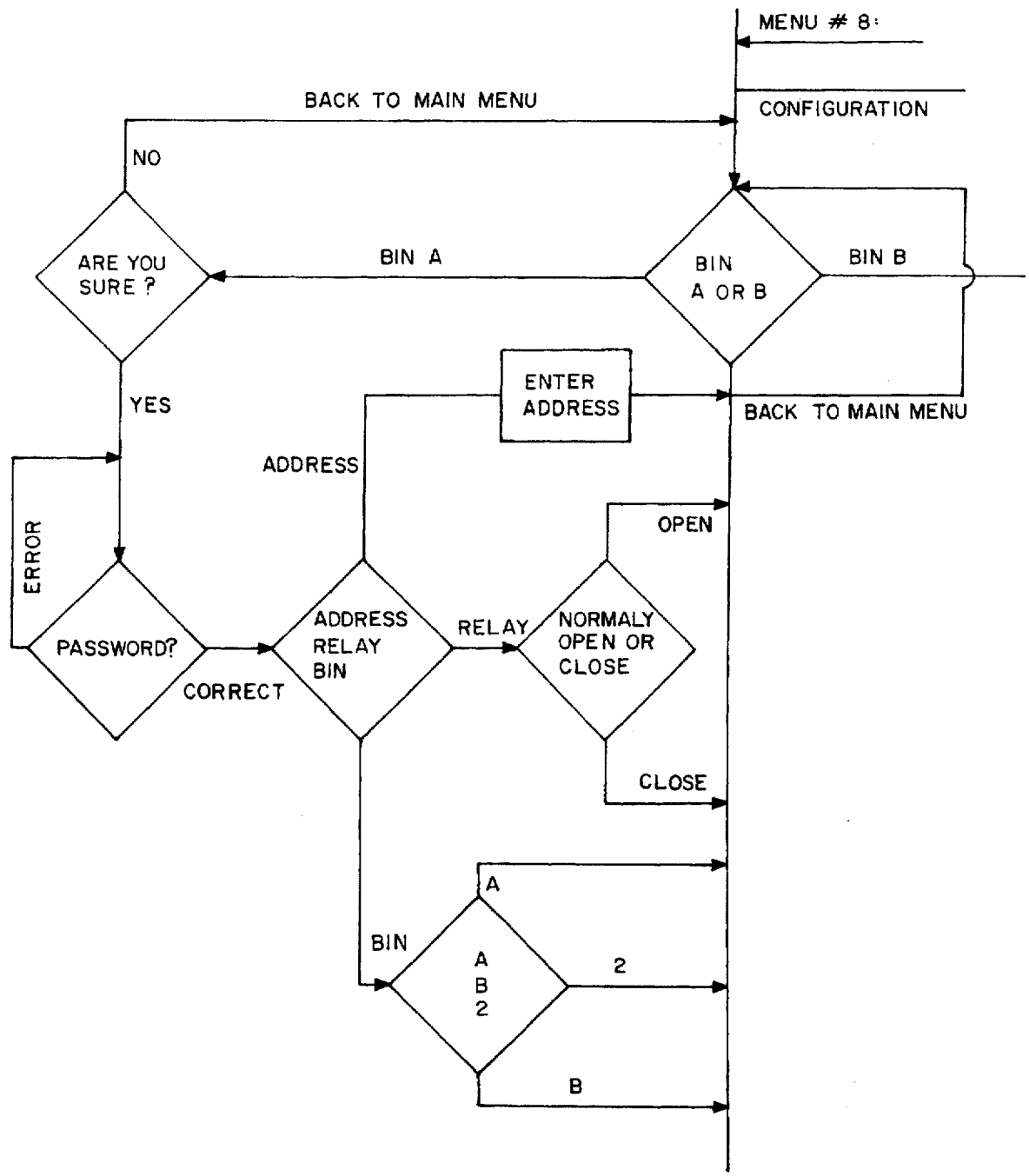
Figure 3E:
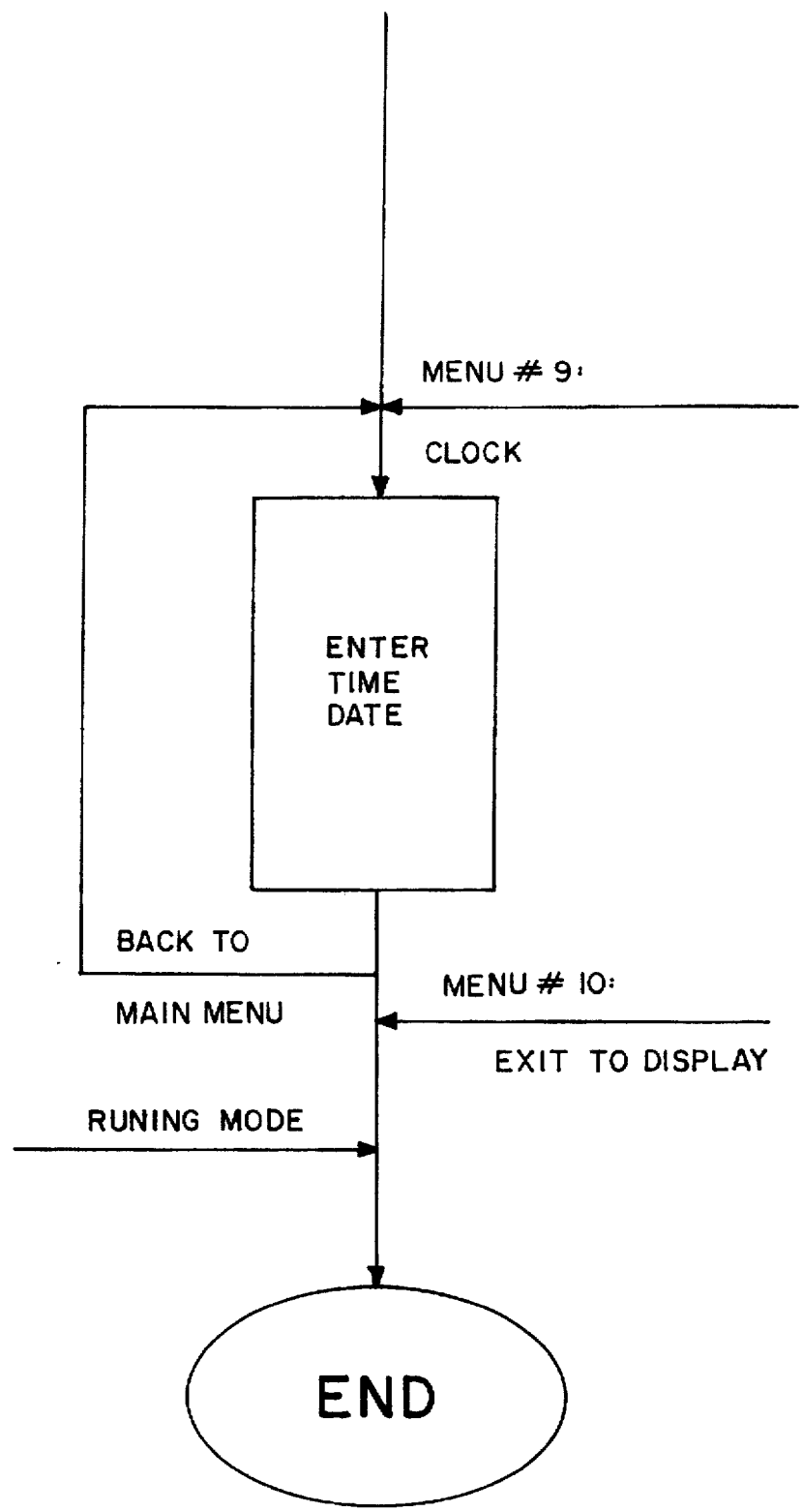
Figure 4B:
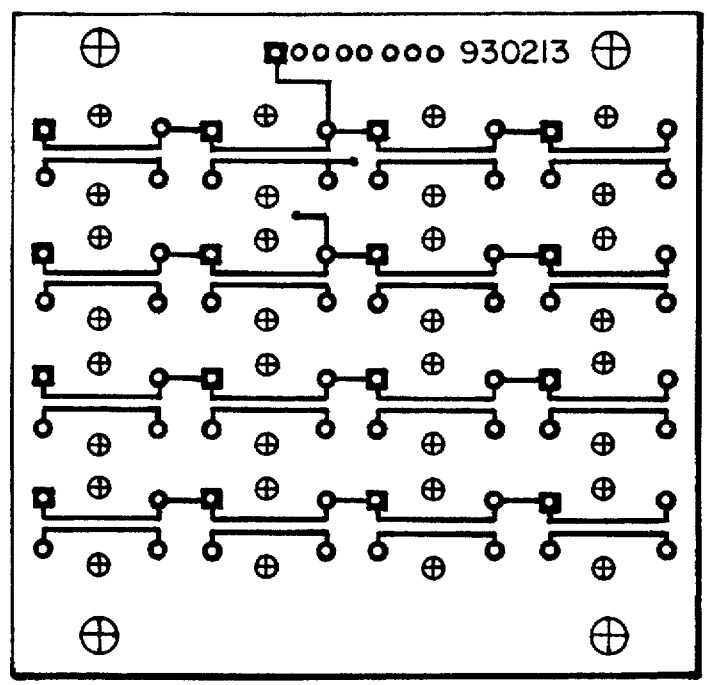
Figure 4C:
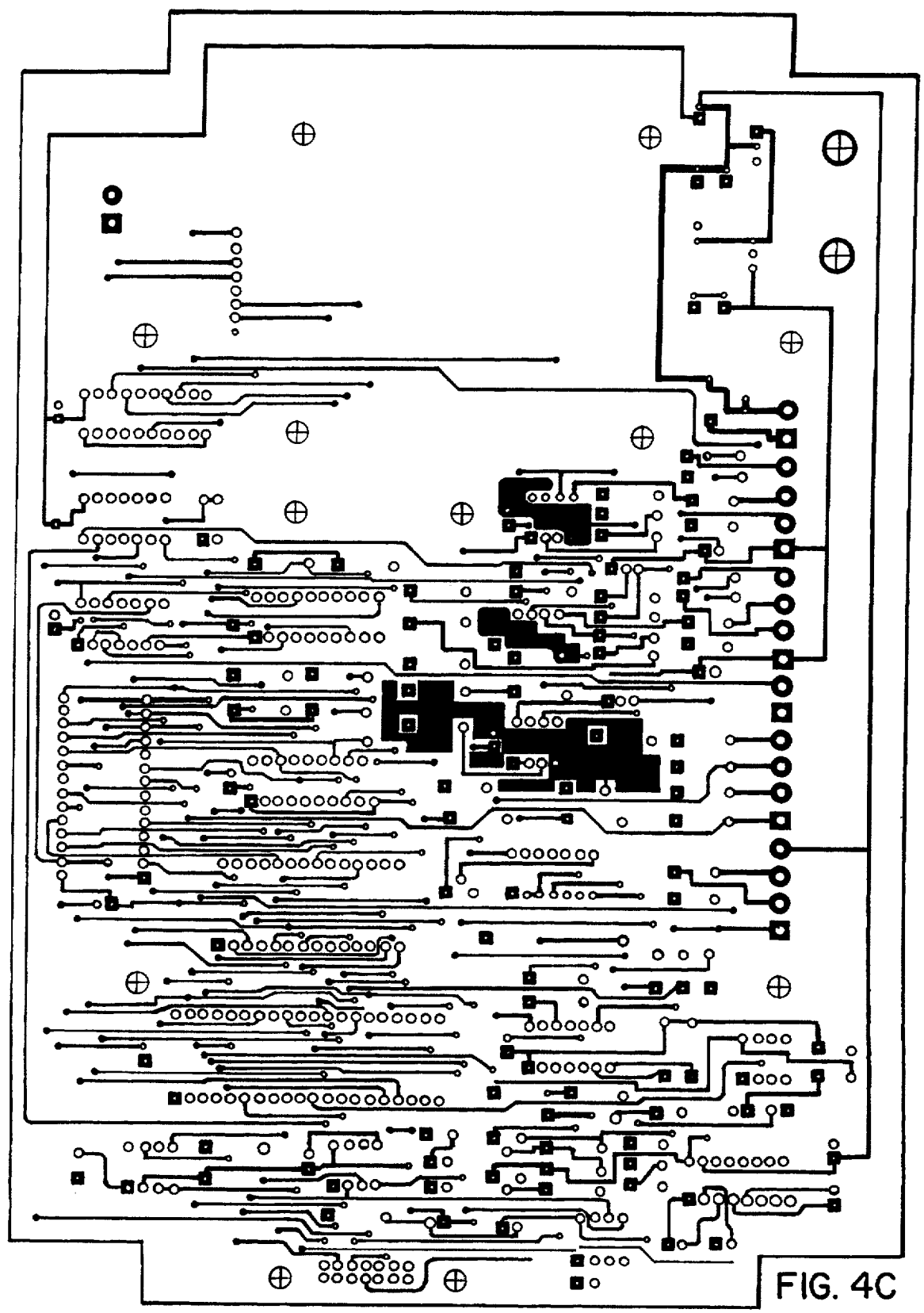
Figure 4D:
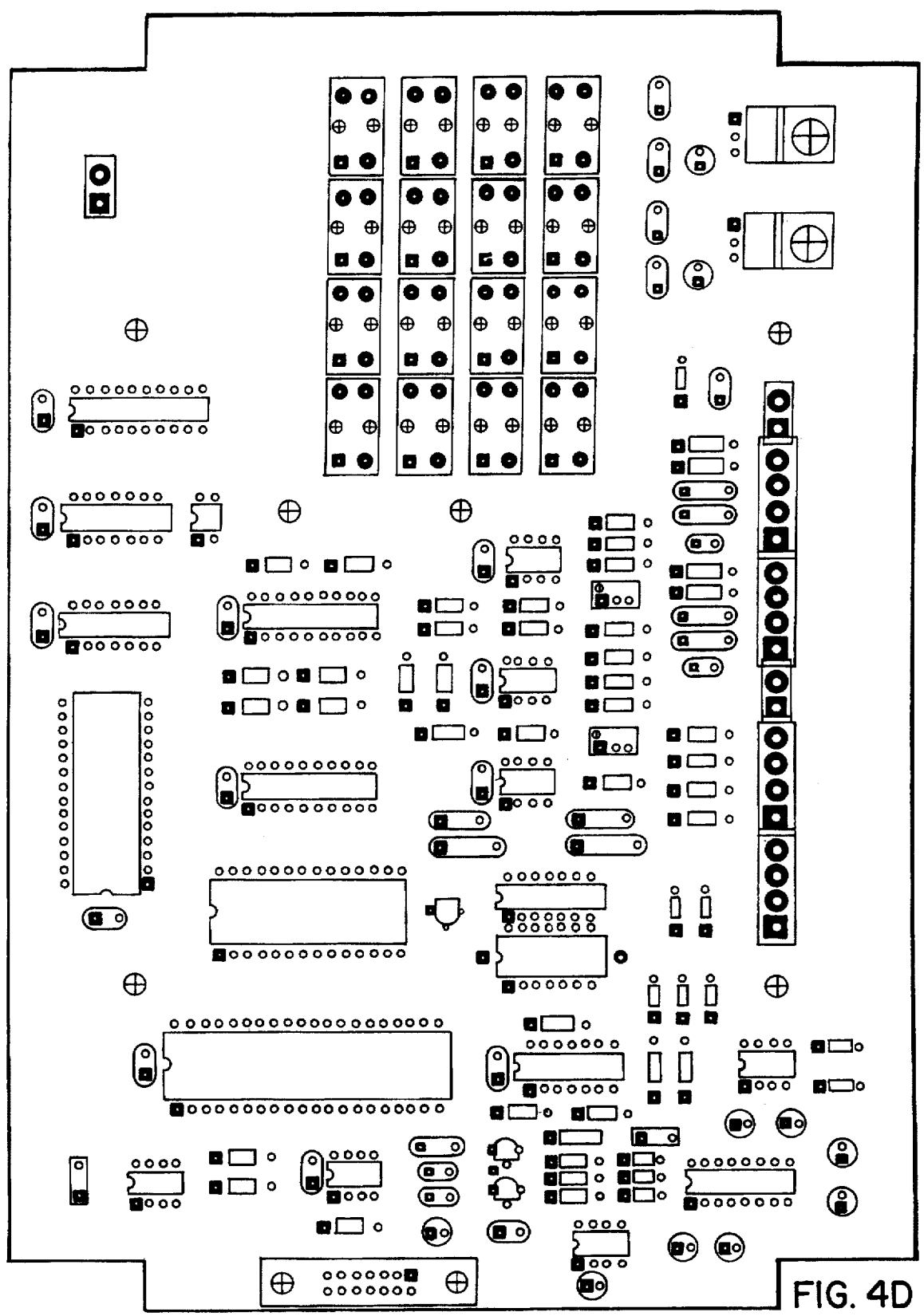
Figure 4E:
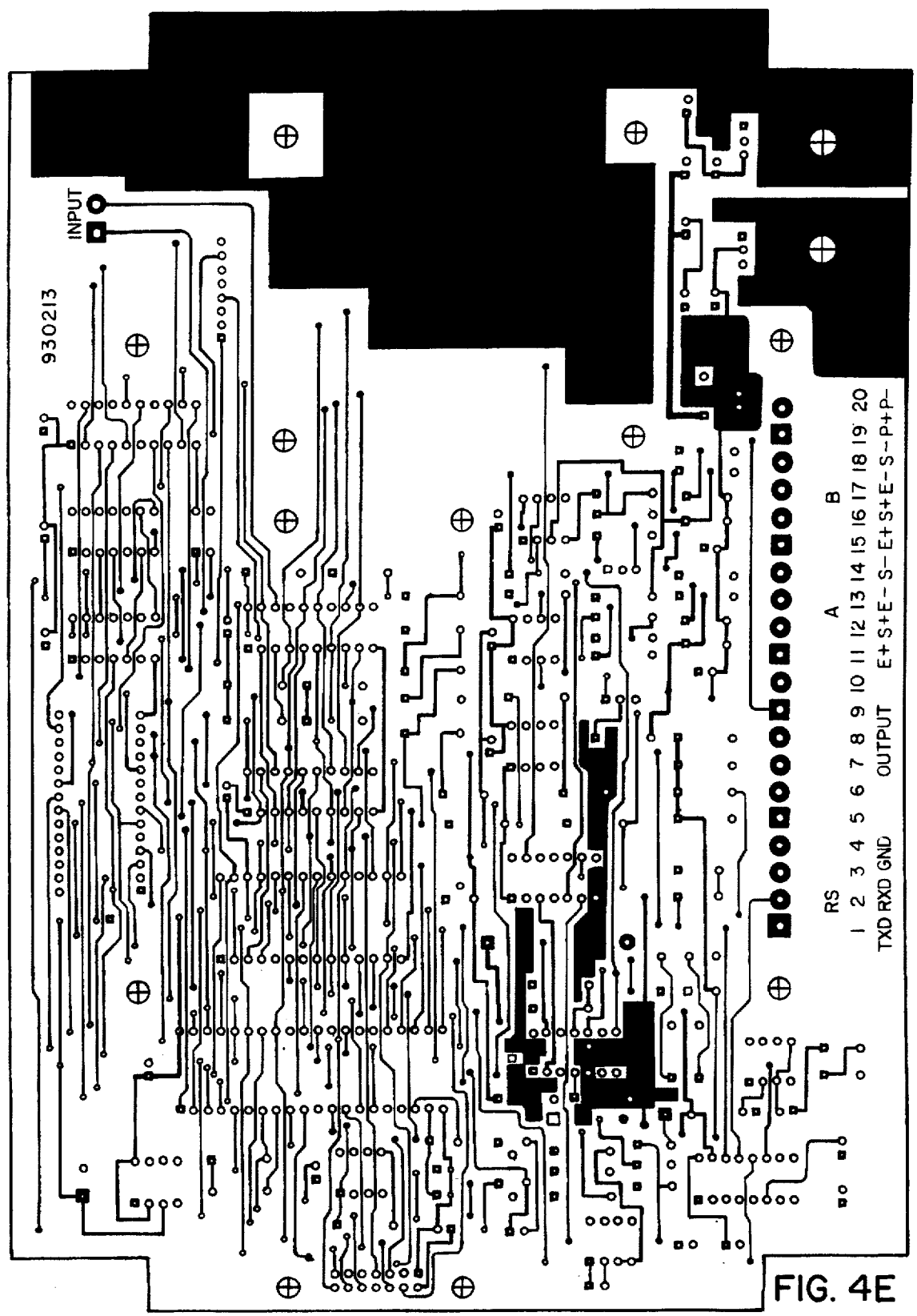

As shown in FIG. 3a, the input signal from load sensors, 100 is communicated to data processing and display means, shown as 102 in FIG. 3a. Once running, the system is constantly sensing changes in the weight of the entire bin and generating input signals corresponding to the weight, and processing the input signals accordingly.

As described above, the system of the present invention may include open/close sensor (switches) on the delivery port, and dispensing port, of the feed bin for generating signals corresponding to whether the ports are open are closed. Similarly, the system may include a sensor which senses whether any dispensing means in the feed bin are operating to dispense feed. The signals generated by these sensors are electrically communicated to the data processing and display means as shown in FIG. 3a.

A significant portion of the remainder of FIG. 3a, and portions of FIGS. 3b, 3c, 3d and 3e are devoted to the operation of an embodiment of the present invention, with reference to menus pre-programmed into the processing means, for display on the display means. The menus prompt user inputs which allow the system of the present invention to monitor and control feed flow. Examples of menus which may be utilized in the system of the present invention are set forth in the following Example.

The function and operation, and the menus, of the system of the present invention will be described hereinafter starting with an empty bin.

Upon installation of the system, a farm operator will establish a "zero" value corresponding to the weight of the feed bin, and components utilized therein. The "zero" value is referred to herein as $W_0$ and the time/date that the zero value is obtained is referred to as To. The zero values $W_0$ and $T_0$ are stored in memory in the processing means.

In order to ensure and maintain linearity the data processing device (processing means) registers and retains the signal intensity from the load cells at both zero and full load levels. Once registered the controller is capable of calculating any given weight between the zero value and the maximum (full bin) value. If any component within the system has to be replaced, it is likely to cause loss of these two values. The current invention has a new and improved method to deal with that loss by retaining in memory a reference value to both the zero and calibration points. By re-entering the reference value the user on the farm is able to perform zero and calibration procedures regardless of the actual material weight in the bin, thus providing the advantage that the feed bin does not have to be emptied to establish a new zero value.

Upon delivery of feed to the bin, the delivery port is opened, sending an input signal (open) to the processing means. Feed is then added to the bin, increasing the weight of the feed bin and thereby causing the load sensors to send a new signal, $W_1$ to the processing means. After feed delivery, the delivery port is closed, sending a different input signal (closed) to the processing means. After receiving the open and closed signals from the delivery port sensor(s), the processing means retains $W_1$ in memory means, and calculates the weight and amount of feed in the bin $F_1$ by subtracting $W_0$ from $W_1$. As will be recognized by those of ordinary skill in the art, electronic weighing instruments are based on signals originated at the load sensors and processed by the logic controller. Actual weight display is a conversion of the electrical signal to weighing units like pounds or kilograms.

Alternatively, the processing means may be programmed to stop operation of the dispensing means, for a predetermined time, when a weight increase in the weight of the bin is sensed by the weighing means. For example, the dispensing means may be stopped for 10 seconds when a weight increase is detected. If after 10 seconds the weight of the bin corresponds to the weight prior to the increase, the dispensing means may be restarted. If a new increased weight is detected, the dispensing means remains stopped until no change in weight over a 10 second interval is detected by the weighing means.

The need to detect feed delivery to the bin derives from the situation that conventionally utilized weighing systems (load sensors) are incapable of accurately measuring quantity of substance that increases and decreases at the same time. Thus, in the system of the present invention the sensor on the delivery port and dispensing port, and the sensor on the dispensing means, provide means for ensuring that the signal generated by the load sensors is accurate. The processing means may be programmed to ensure the delivery port is closed, and the dispensing means are not operating, before utilizing a signal from the load sensors in any calculations or displays.

In addition to providing accuracy, the foregoing portion of the system of the present invention provides a means for monitoring actual feed deliveries to the farm as a way of keeping everyone involved honest and as a tool for better planning. Tracking actual feed deliveries is equally important to the farmer who owns the farm or to the company that owns the animals because it give them the information (time and quantity) that they could not otherwise obtain (on many occasions the feed is being delivered at a time when no one is present on the farm).

In order to prevent inaccuracies, the system of the present invention is preferably programmed to constitute a "delivery" only if and when quantity added reaches specified minimum material weight, preferably greater than or equal to 250 lbs., more preferably greater than or equal to 500 lbs. This feature minimizes false calculations in situations when there is a temporary increase in weight (a person steps on the bin) and actual feed delivery has not been performed. In addition there are fluctuations in material net weight, as registered by the data processing and control means, due to the affect of outside forces such as wind on the storage vessel, changes in the eveness of the material surface inside the storage vessel and/or a temporary weight increase due to a person or animal climbing onto, or leaning on the storage vessel.

Dispensing feed in different quantities (feed restricting) is a conventional practice in the farming industry. From the farm operator's point of view it is desirable and more efficient to be able to dispense feed on the basis of both dispensing time and quantity dispensed.

It is generally accepted that the cost of feed amounts to 65%–75% of total meat production costs. Therefore feed conversion, the ratio of feed quantity to meat produced, is often thought the single most important indicator of profitability during the life of a given livestock. It is also advantageous to track feed conversion in order to optimize marketing timing. The system of the present invention includes a new and improved method to constantly calculate and display the total cumulative feed quantity dispensed out of the vessel to enable the farm operator quick and accurate access to the total feed quantity consumed to a certain point in time.

In the system of the present invention, when feed is dispensed, the dispensing port is opened sending an input signal (open) to the processing means. The dispensing means are then started, causing the dispensing means sensor to send an "on" input signal to the processing means. When the dispensing means are stopped, the dispensing means sensor sends an "off" input signal to the processing means. The processing means calculates feed dispensed from the weight difference between the weight of the feed prior to the dispensing means beginning operation, and the weight of the feed after the dispensing means has stopped operation. For example, the first time feed is dispensed, the amount (weight) of the feed prior to dispensing may be considered $F_1$, as above. The amount of feed remaining in the bin after dispensing, $F_2$ may be determined by processing the signal from the load sensors after the dispensing means is stopped. The quantity of feed dispensed $F_D$ equals $F_1-F_2$. The processing means of the system of the present invention stores the amount of feed dispensed each dispensing cycle, $F_{D1}$, $F_{D2}$, $F_{D3}$ ... in memory means and calculates and may display the cumulative amount of feed dispensed as $F_{DCum}= F_{D1}+F_{D2}+F_{D3}$ ...

Feed ordering and delivering procedures are derived from:

a) Level of feed in the storage vessel out on the farm.

b) Size of storage vessel.

c) Lead time for manufacturing and transporting the feed to the farm.

d) Rate of livestock feed consumption.

e) Nature of feed supplied to the farm (freshness, medicated, ration, cost, etc.).

There is a constant need to detect a predetermined feed level in order to start the chain of events that ultimately lead to the actual supply of feed to a particular vessel.

The current invention has a new and improved method to program the monitoring/controlling device to input high or low set point so alarm could be triggered when feed level falls below or rises above a certain level. This will also assist in preventing spills due to overfills. Thus, in the system of the present invention a user may input a set point weight for the bin, which is stored in the memory means and when reached causes the processing means to generate a control signal which stops the operation of the dispensing means. Alternatively, the user may input a set point weight for the bin, which is stored in the memory means, and when reached causes the processing means to generate a audio alarm, or display an alarm message on the display means. These two features may be utilized in tandem, to trigger an alarm when the amount of the feed in the bin reaches a level where only a certain amount of feed is left in the bin, and then halt operation of the dispensing means when substantially no feed is left in the bin. The alarm would alert a user to refill the bin. For example, if the process of delivering additional feed to the bin takes two days to complete, the alarm could be triggered to alert the user when an amount of feed sufficient for feeding the livestock for up to two days remains in the bin. The user could then order additional feed which would, in theory, be delivered prior to the bin running out of feed.

In a preferred embodiment, the processing means of the system of the present invention is utilized to control the feed dispensing means. One way by which the processing means may activate and deactivate the dispensing mechanism is by engaging and disengaging an electrical contact. Contacts (relays) are engaged by transfer of current through a coil that created a magnetic field which in turn pulls a set of contact point together and causes conductivity.

The system of the present invention advantageously allows an operator to program the processing means to activate/deactivate the dispensing means utilizing either a normally open contact or a normally closed contact initial basis. This feature ensures better durability and determined upon how long during a feeding day the dispensing mechanism is operational. The normally open/normally closed state may be determined by processing the input signal from the dispensing means.

As realized in the art, it is generally advisable to deactivate the dispensing means when the feed bin runs out of feed and therefore is empty. The system of the present invention advantageously includes means for automatically deactivate the dispensing means to stop the outgoing flow of feed from the bin while the bin is being refilled or when the bin reaches emptiness. This feature results, in part, from input signals from both the load sensors and the delivery port sensing means. As explained above, a zero value corresponding to the weight of the bin without feed, is determined as stored in memory means in the processing means. When the processing means calculates that the weight of the feed in the bin is near zero, i.e. that the total weight is near the zero value, the dispensing means is stopped by the processing means. Similarly, as set forth above, when the delivery port sensing means send an "open" input signal to the processing means, the dispensing means is stopped by the processing means. The preprogrammed processing means may be programmed to automatically resume dispensing when either feed delivery to the bin has been completed or when feed level is above zero, by performing similar calculations, or receiving a "closed" signal from the delivery port sensing means.

In a farming environment there are workers who are not qualified or authorized to operate the feed control system, and there is a need to prevent those from tempering and destroying important data.

The system of the present invention advantageously permits users to be screened and authorized operators identified by incorporating a two stage screening procedure.

The first step poses a question to the user of yes/no and the secondary step forces the user to enter a 4 digit password which clears his access to a given menu item. The questions are posed in displays generated by the processing means and displayed on the display means. The input means associated with the processing means allows the user to enter the requested information. User passwords and the like are stored in the memory means associated with the processing means.

The livestock industry includes 4 basic elements:

i) Feed mill ii) Live production iii) Meat processing plant iv) Management.

Flow of information between these elements is advantageous to ensure profitability.

The system of the present invention also allows for the transmission of data from the processing means electrically connected to the feed bin sensors and equipment to a distribution point from which it is interfaced to the entire system. Thus the processing means may include a serial port, or the like, which allows interface with a modem, or a direct electronic data transfer link, to processing means utilized in other areas. Data from the memory means, and current calculations, could be transferred electronically to processing means utilized in other areas. For example, data from the memory means could be transferred to the feed manufacturing process wherein feed is batched, mixed, cooked and/or pelleted, to give the feed manufacture feedback on the suitability of the feed. The data from the memory means could also be utilized for determining the health of the livestock herd, as healthy herds tend to consume feed at certain rates.

The operation of an embodiment of the system of the present invention may also be understood with reference to a preferred menu system for use in the present invention, such as that set forth in the following example.

EXAMPLE

This example illustrates a possible menu system for use with a system of the present invention, and also illustrates one method of operation of the system of the present invention to monitor and control the dispensing of feed from a feed storage vessel. The system is described with reference to a feed storage vessel utilizing a motor driven auger as dispensing means. The operation of the motor is controlled by through the use of a relay between the motor's power source and the motor.

The menu system and the method of operation of the system of the present invention are described with reference to a particular configuration of input, display and pre-programmed processing means. The description is meant to be illustrative of a possible configuration of the system of the present invention.

As shown in FIG. 2, a processing and display means 50 for use in the system of the present invention may include alphanumeric and/or function keys, 62, capable of being depressed (pressed) to generate input signals; and display means 64, for providing a visual display of data processed by the processing means, and for providing menu prompts to a user of the system. In general operation, the display means display the quantity (weight) of feed in the selected bin (A or B), and the time of day.

In a preferred embodiment depicted in FIG. 2, a main menu is provided in substantially permanent form on the cover of the data processing and display means, and the function keys are labeled "Menu", "Enter", "Go" and "Stop". The main menu includes 10 choices as set forth below:

| MENU CHOICE | FUNCTION |
| --- | --- |
| 1. DISPENSING | Set time limits "from" "to" and quantity "lb" for bin A and/or Bin B to automatically dispense feed. |
| 2. DISPLAY LAST DELIVERY | Display added quantity delivered to Bin A/B since last delivery date. |
| 3. DISPLAY CUM. DISPENSE | Display cumulative total quantity dispensed since last reset. |
| 4. RESET CUM. DISPENSE | Set cumulative quantity dispensed to zero for Bin A or Bin B. |
| 5. SET ALARMS. | Set feed quantity level alarm for Bin A and/or Bin B as feed ordering indicator. |
| 6. ZERO LOAD CELLS | Set load cells to zero for empty Bin A and/or Bin B. |

-continued

| MENU CHOICE | FUNCTION |
| --- | --- |
| 7. CALIBRATION | Set calibration values to correspond to the current amount in Bin A or Bin B. |
| 8. CONFIGURATION | Set the system to indicate one or two bins. Set the dispensing means relay to normally opened or closed position. Set an address to the system (1–32) for communication identification. |
| 9. TIME/DATE. | Set time and date. |
| 0. EXIT TO DISPLAY | Display of actual feed quantity in both bin A and bin B and status of A/B system (Low level alarm, dispense, delivery, stand by, etc.). |

The processing means may be configured so that switching between programming and operational modes of the processing means may be accomplished by depressing the "menu" button for a fixed period of time, e.g. 5–10 seconds, to change between modes. After the "menu" button is depressed, the programming mode is entered and the display cycles between "Main menu" and "1) Dispensing", or any of the menu items' titles).

Depressing the "menu" button when in the main menu will take you down to the next menu item or back to the sub-menu title if you are already inside a sub menu.

Depressing the "←" or "→" arrow buttons will move the cursor right and left when you are inside a sub menu programming mode.

To exit the programming mode "0" (Exit) is depressed followed by "Enter" (will take about 10 seconds).

Depressing the "Stop" button will always override the program and disengage any feeder activated at the time.

Depressing the "Go" button will always override the program and engage any feeder that is being called by the program to be activated.

Feed delivery (added quantity to the bin) or feed bin empty will disengage the relays and stop the dispensing means. Resumption in feed dispensing program will occur 1 minute after feed delivery has been completed.

A more detailed description of the main menu items, and their operation follows.

MENU #1: DISPENSING BIN A/B

Depress "Menu" continuously to go to the main menu and depress "Enter" when the display is "1) DISPENSING".

"DISPENSE A/B" will be displayed. A choice between feed storage bin A or feed storage bin B may be made by moving the cursor to A or B using the arrow keys. Depressing "Enter" will cause the program to move forward to sub menu #1 (Bin A or B)

Assuming bin A is selected "1.0:00 To 0:00" will be displayed. Dispensing times "From" and "to" may be entered utilizing a 24 hour time format, e.g. 13:00 for 1:00 pm. Depressing enter will validate the time limits for bin A.

"1.BN A QNT: #lb" will be displayed. (As used in the description of the menu displays "#" may refer to a number sign ("#") or an actual number 0–9. The amount of feed to be dispensed at the above time limits may be entered and "Enter" depressed to validate. If no data for feed quantity is entered, the program will not exit this sub menu to ensure adequate supply of feed.

If an amount of feed is entered, "2.0:00 TO 0:00" will be displayed. The same procedure may be repeated to dispense feed at different times. The dispensing means will be disengaged when either the time or the quantity (whichever comes first) reaches the entered limit.

The foregoing procedure may also be repeated to control dispensing of feed from bin B.

In a preferred embodiment, a maximum of 7 different feedings in a 24 hours period may be entered for each bin.

If it is desired to reactivate the dispensing of the programmed quantity within the same time frame, the "Menu" button may be continuously depressed and re-depressed until the "Main Menu" prompt and then "Exit to Display" prompt appears. The dispensing means will be reactivated.

For free feeding (continuous feeding) the dispensing time may be set to 24 hours (for example: 8:00–7:59) and feed quantity above daily consumption.

To go to the next menu item the "Menu" button is depressed.

Menu #2: LAST FEED DELIVERY.

"Enter" is depressed when "2) LAST DLVR BN A/B" is displayed.

The cursor may be moved to A or B using the arrow keys and "enter" depressed to display the last delivery for the desired bin, for example "A".

"##:##(time)##-##-##(date)" is displayed for 3 seconds. Then "BIN A #.Lb"(Quantity delivered) is displayed.

The "last delivery" value is a combined sum of all one day deliveries. It is generally less accurate than other system values and could fall out side the 1% system's accuracy range.

The same procedure may be repeated for the other bin by moving the cursor to "B"and depressing "Enter". "LAST DLVR BN A/B" is displayed. Depressing enter again starts the process for bin B.

To go to the next menu item the "Menu" button is depressed.

Menu #3: CUMULATIVE DISPENSED QUANTITY FROM LAST RESET.

"Enter" is depressed when "3) CUM TOT A/B" is displayed.

The cursor is moved to "A" or "B", corresponding to Bin A or Bin B, using the arrow keys and "Enter" is depressed.

If "A" is selected "Bin A #Lb" is displayed.

The procedure may be repeated for the other bin ("B") by depressing "Enter" and selecting bin B.

To go to the next menu item the "Menu" button is depressed.

Menu #4: RESET CUMULATIVE DISPENSED QUANTITY

"Enter" is depressed when "4) RST CUM TOTL A/B" is displayed.

The cursor is moved to "A" or "B", corresponding to Bin A or Bin B, using the arrow keys and "Enter" is depressed.

A two step security system is employed to prevent accidental, or unauthorized, resetting of the cumulative total. If "A" is selected "ARE YOU SURE? Y/N" is displayed. The cursor may be moved to "Y" to indicate "Yes" and "Enter" depressed.

"Password 0000" is displayed. The users 4 digit password code is entered and "Enter" depressed.

"BIN A RESET DONE" is displayed to indicate the resetting has been accomplished.

The same procedure may be repeated for bin B by selecting bin B.

To go to the next menu item the "Menu" button is depressed.

Menu #5: SET ALARM FOR MINIMUM FEED INVENTORY LEVEL.

This menu and this feature of the system may be utilized to determine when additional feed needs to be ordered.

"Enter" is depressed when "5) LVL ALARM BN A/B" is displayed.

The cursor is moved to "A" or "B", corresponding to Bin A or Bin B, using the arrow keys and "Enter" is depressed.

If "A" is selected "ALARM BN A #" is displayed. The amount of feed inventory which will trigger the alarm may be entered utilizing the numeric keypad.

"Enter" is depressed to validate the entry or to repeat the same procedure for bin B.

To go to the next menu item the "Menu" button is depressed.

Menu #6: Zero load cells for Empty bins.

"Enter" is depressed when "6) ZERO LDCL BN A/B" is displayed.

The cursor is moved to "A" or "B", corresponding to Bin A or Bin B, using the arrow keys and "Enter" is depressed.

A two step security system is employed to prevent accidental, or unauthorized, zeroing. If "A" is selected "ARE YOU SURE? Y/N" is displayed. The cursor may be moved to "Y" to indicate "Yes" and "Enter" depressed.

"Password 0000" is displayed. The users 4 digit password code is entered and "Enter" depressed.

""WGHT/REFER/DUMP" is displayed. The cursor is left on "WGHT", if the empty bin is being utilized for a zero reference and "Enter" is depressed.

"PLEASE WAIT . . ." is displayed. After 3 seconds: "BIN A ZERO DONE" is displayed to indicate the resetting has been accomplished.

"DUMP" may be selected using the cursor control keys (arrow keys) if it is desired to retrieve the zero value of the load cell's set for future use. The cursor is moved to the "D" and "Enter" depressed.

"REFER" may be selected using the cursor control keys (arrow keys) if it desired to down load the load cell's zero value (as retrieved earlier from the Dump) into memory. The cursor is moved to the "R" and "Enter" depressed. "A ZERO" is displayed. The zero value of the Bin A load cells is entered using the numeric keypad and "Enter" depressed.

It is recommended to retrieve the zero value by using the "Dump" and store it in a safe, accessible place for retrieval at a future time. The data references are needed to zero the system without emptying the feed bin, when the control system is serviced, or a control board replaced. This zero value is a constant value that changes only when a load cell is replaced.

The same procedure may be repeated for bin B by selecting bin B by depressing the "Enter" button.

To go to the next menu item the "Menu" button is depressed.

Menu #7: CALIBRATION BIN A/B.

Before entering the calibration mode a known weight must be added to the bin, either by actual feed delivery weight, or by having a weight applied to each load cell (and the total weight determined by adding up the individual weights. The calibration mode should not be entered, and calibration should not be executed when the bin to be calibrated is empty.

"Enter" is depressed when "7) CALIBRATE BN A/B" is displayed. The cursor is moved to "A" or "B", corresponding to Bin A or Bin B, using the arrow keys and "Enter" is depressed.

A two step security system is employed to prevent accidental, or unauthorized, calibration. If "A" is selected "ARE YOU SURE? Y/N" is displayed. The cursor may be moved to "Y" to indicate "Yes" and "Enter" depressed.

"Password 0000" is displayed. The users 4 digit password code is entered and "Enter" depressed.

"WGHT/REFER/DUMP" is displayed. For calibrating the system using a known weight, the cursor is left on "WGHT" and "Enter" depressed.

"BN A AMT: ####Lb" is displayed. In the ####space the actual amount read by the load cells will be displayed. If the difference is more than 1% from the known weight, the actual amount in bin A is entered using the numeric keypad.

If the displayed amount is within 1% of the known weight, or after the known weight has been entered, "Enter" is depressed. "CALIBRATE BIN A/B" is displayed to indicate the calibration has been completed.

"DUMP" may be selected using the cursor control keys (arrow keys) to retrieve the calibration reference ratio ({|indicated weight—known weight}/known weight). The cursor is moved to "D" and "Enter" depressed to display the ratio for 2 seconds.

"REFER" may be selected using the cursor control keys (arrow keys) if it desired to down load the calibration reference ratio (as retrieved earlier from the Dump procedure) into memory. The cursor is moved to the "R" and "Enter" depressed. "A RATIO=#" is displayed. The ratio may be entered using the numeric keypad and "Enter" depressed.

It is recommended to retrieve the ratio by using the "Dump" procedure and store the ratio value in a safe, accessible place for retrieval at a future time. The data references are needed to calibrate the system without emptying the feed bin, when the control system is serviced, or a control board replaced. This ratio value is a constant value that changes only when a load cell is replaced The same procedure may be repeated for bin B by selecting bin B by depressing the "Enter" button.

To go to the next menu item the "Menu" button is depressed.

Menu#8: CONFIGURATION

"Enter" is depressed when "8) CONFIGURATION" is displayed.

A two step security system is employed to prevent accidental, or unauthorized, resetting of the cumulative total. If "A" is selected "ARE YOU SURE? Y/N" is displayed. The cursor may be moved to "Y" to indicate "Yes" and "Enter" depressed.

"Password 0000" is displayed. The users 4 digit password code is entered and "Enter" depressed.

"BIN/RELAY/ADDR" is displayed. To select and enter the bin(s) in use, the cursor is left on "BIN" and "Enter" depressed. "BIN IN USE A,B,2" is displayed. The cursor is moved using the arrow keys to A,B or 2 (to indicate No. of bins in use) and "Enter" depressed to select the bin(s).

To select and enter the configuration of the relay utilized in the dispensing means, the cursor is moved to "RELAY" utilizing the arrow keys and "Enter" depressed. "RELAY NORMAL O/C" is displayed. The default setting is Normally Open. Using the arrow keys, the cursor is moved to C for normally closed, or O for normally opened. "Enter" is depressed to select and validate the selection.

To select and enter an address the cursor is moved to "ADDR" using the arrow keys and "Enter" is depressed. "ADDR (01-32)=00" is displayed. The desired address is entered using the numeric keypad and validated by depressing "Enter".

"8) CONFIGURATION" is displayed.

The same procedure may be repeated for bin B by selecting bin B by depressing the "Enter" button.

Menu #9: SET TIME/DATE

"Enter" is depressed when "9) SET TIME/DATE" is displayed.

"##:##(time)##-##-##(date)" is displayed. The correct time and date may be entered using the numeric keypad and validated by depressing "Enter".

The system may be programmed so that if incorrect data is keyed in, the system will not accept validation by depressing "Enter".

Menu #10(0): EXIT TO DISPLAY

"Enter" is depressed when "0) EXIT TO DISPLAY" is displayed.

Depressing "Enter" and will switch the system from the programming to the display mode. "PLEASE WAIT . . ." is displayed while the system is switching, which generally takes about 10 seconds.

The following functions may be performed by the keys of the numeric keypad in the embodiment depicted in FIG. 2.

1. Cursor: will blink in the background of the next data space inquiry.

2. Menu:

When in running display will take the user to the main menu through a 2 seconds display of a message: "MAIN MENU"

When inside a sub menu will take the user one step backwards to the sub menu title.

When in the main menu will move the user down to the next menu item (from menu item #0 "Exit" back to item #1 etc.).

3. Enter: Will validate and process data that was added to the program.

Will move to the next line in the menu.

Will store the data in the memory.

Is used to recall programming.

4. Key-pad number:

Used to enter numeric in the programming mode.

Will move the cursor to the next space of data inquiry in the same line.

Note: Entering a number will erase the number in the same space. If insufficient digits are entered to completely erase the previous number the display should be zeroed and the new number re-entered.

5. Arrow to the right →:

Will move the cursor to it's next space to the right when in programming mode.

Will advance the main menu sequentially from item 1 to 10.

6. Arrow to the left ←:

Will move the cursor to it's previous inquiry to the left when in programming mode.

Will back track advance the main menu sequentially from item 10 to 1 when in main menu.

7. Go:

Will activate any relay (feeder or alarm) that is called to be engaged by the program.

8. Stop:

Will deactivate any relay that is called to be engaged by the program.

Will display a "stop" message and the current amount of feed in the bin (the normal operational screen) interchangeably. The message "Stop" will be displayed on the full screen.

9. Password:

Will enable the user to enter the following modes:

Reset cumulative dispense.

Zero load cells.

Calibration.

Configuration.

10. "STDBY"

Message on the display indicating the dispensing program is ACTIVE and Stand by for the next feeding.

19

11. "DSPNS"
   Message on the display indicating the feeder's relay is activated and feed is being dispensed.
12. "DLVRY"
   Message on the display indicating delivery of feed is taking place (will also stop dispensing until one minute after delivery is finished.)
13. "STOP"
   Message on the display indicating feeder relays are deactivated.
14. "*L"
   Message on the display indicating feed inventory is below the set alarm point.

It is to be realized that the optimum dimensional relationships for the hardware, software and protocols of the invention, to include variations in size, materials, shape, form, function, and manner of operation, assembly and use are deemed readily apparent and obvious to one skilled in the art and all equivalent relationships to those illustrated in the drawings and described in the application are intended to be encompassed herein. The foregoing is considered as illustrative only of the principles of the invention.

Since numerous modifications and changes will readily occur to those skilled in the art, it is desired not to limit the invention to the exact construction and operation shown and described. All suitable modifications and equivalents that fall within the scope of the appended claims are deemed within the present inventive concept.

I claim:

1. A system for monitoring and controlling material flow from a material storage vessel, the vessel having a delivery port to allow the addition of material to the vessel and dispensing means for dispensing material from said vessel, the system comprising:
   means for generating a weight signal corresponding to the weight of the storage vessel, wherein said weight signal generating means will not generate a weight signal unless the weight of said storage vessel changes by a user-defined minimum amount;
   means for controlling whether the dispensing means is operating;
   input means for entering commands and numbers and for generating input signals corresponding to said commands and numbers;
   processing means, including clock means, for processing said input signals, for generating control signals in response to said weight signal and input signals to control said dispensing means operation and for generating data based on calculations performed utilizing said weight signal, said input signals, said clock means and said dispensing means operation;
   memory means for storing said weight signals, input signals and said generated data;
   display means for displaying data generated by said processing means and for displaying a prompting screen for prompting the entry of data utilizing said input means;
   communication means for communicating said weight signal and said signals generated from said input means to said processing means, and for communicating said control signals and display signals generated by said processing means to said controller and said display means; and
   feeding means for providing animal feed to animals, said feeding means receiving animal feed from said storing means through said dispensing means.

20

2. The system of claim 1 further comprising:
   means for generating an open/close signal corresponding to the state of a delivery port of the storage vessel, wherein an open signal is generated when the delivery port is open and a closed signal is generated when the delivery port is closed.
3. The system of claim 1 further comprising:
   prompting means, preferably in the form of at least one menu, for prompting user inputs through said input means.
4. The system of claim 1 further comprising:
   means for programming the processing means to generate an alarm corresponding to user definable weights of the storage vessel.
5. The system of claim 1 further comprising:
   second communication means for communicating said data generated by said processing means to additional processing means.
6. The system of claim 1 wherein the processing means further comprise:
   security means for preventing input signals from unauthorized users to generate control signals, and for screening access to said generated data retained in said memory means.
7. The system of claim 1 wherein the processing means further comprise:
   means for programming the processing means to generate a control signal to halt the operation of the dispensing means when the weight of vessel reaches a user definable level.
8. The system of claim 1 wherein the means for controlling operation of the dispensing means comprises a relay, and the system further comprises means for configuring the controlling means based on a normally open or a normally closed relay.
9. The system of claim 1 wherein the system monitors and controls more than 1 vessel.
10. The system of claim 1 further comprising: means for programming the processing means to halt the dispensing means while material is being added to the vessel.
11. The system of claim 1 wherein the processing means are programmed to generate a delivery value for storage in said memory means when the difference between a first and a second weight signal is greater than or equal to a preprogrammed minimum weight.
12. The system of claim 11 wherein said clock means generate a date and time corresponding to said delivery value and said date and time are stored in said memory means.
13. The system of claim 1 wherein said system is used in an outdoor environment.
14. The system of claim 1 wherein said dispensing means will not dispense material when the weight of said storage vessel falls below a user-defined amount.
15. A system for controlling, regulating, and adjusting the flow of animal feed in the feeding of animals, said system comprising:
   storing means for storing animal feed, said storing means having a delivery port to allow the addition of material to said storing means and further having a dispensing means for dispensing material from said storing means;
   weight signal generating means for generating a weight signal corresponding to the weight of said storing means, wherein said weight signal generating means will not generate a weight signal unless the weight of said storing means changes by a user-defined amount, said weight signal generating means in communication with said storing means;

means for controlling the operation of said dispensing means;

input means for entering commands and numbers and for generating input signals corresponding to said commands and numbers;

processing means, including clock means, for processing said input signals, for generating control signals in response to said weight signal and input signals to control the operation of said dispensing means, and for generating data based on calculations performed utilizing at least one of said weight signal, said input signals, said clock means, and said dispensing means;

memory means for storing at least said weight signals, input signals, and said generated data;

display means for displaying data generated by said processing means and for displaying a prompting screen for prompting the entry of data utilizing said input means;

communication means for communicating said weight signal and said signals generated from said input means to said processing means, and for communicating said control signals and display signals generated by said processing means to said controller and said display means; and feeding means for providing animal feed to animals, said feeding means receiving animal feed from said storing means through said dispensing means.

16. The system of claim 15 wherein weight signals corresponding to a known quantity of feed in said storage vessel are stored in said memory means for calibrating said system.

17. The system of claim 15 further comprising:

means for generating an open/close signal corresponding to the state of a delivery port of the storing means, wherein an open signal is generated when said delivery port is open and a closed signal is generated when said delivery port is closed.

18. The system of claim 15 further comprising:

prompting means for prompting user inputs through said input means.

19. The system of claim 15 further comprising:

means for programming the processing means to generate an alarm corresponding to user-definable weights of the storing means.

20. The system of claim 15 further comprising:

second communication means for communicating said data generated by said processing means to additional processing means.

21. The system of claim 15 further comprising:

security means for preventing input signals from unauthorized users to generate control signals, and for screening access to said generated data retained in said memory means.

22. The system of claim 15 wherein the processing means further comprise:

means for programming the processing means to generate a control signal to halt the operation of the dispensing means when the weight of said storing means reaches a user-definable level.

23. The system of claim 15 wherein the means for controlling operation of the dispensing means comprises a relay, and the system further comprises means for configuring the controlling means based on a normally open or normally closed relay.

24. The system of claim 15 wherein the system monitors and controls more than one storing means.

25. The system of claim 15 further comprising: means for programming the processing means to halt the dispensing means while material is being added to the storing means.

26. The system of claim 15 wherein the processing means are programmed to generate a delivery value for storage in said memory means when the difference between a first weight signal and a second weight signal is greater than or equal to a preprogrammed minimum weight.

27. The system of claim 26 wherein said clock means generate a date and time corresponding to said delivery value and said date and time are stored in said memory means.

28. The system of claim 15 wherein weight signals corresponding to a known quantity of feed in said storing means are stored in said memory means for calibrating said system.

29. The system of claim 15 wherein said dispensing means will not dispense material when the weight of said storing means falls below a user-defined amount.

30. The system of claim 15 wherein said system is used in an outdoor environment.

* * * * *